(No Model.)
L. PINAGEL.
APPARATUS FOR EXTRACTING GREASE FROM WOOL.
No. 440,963.                    Patented Nov. 18, 1890.
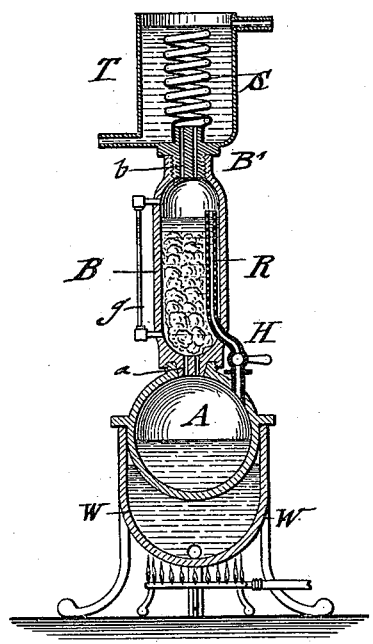
WITNESSES:
INVENTOR:
BY
ATTORNEYS.

UNITED STATES PATENT OFFICE.

LEO PINAGEL, OF AIX-LA-CHAPELLE, GERMANY.

APPARATUS FOR EXTRACTING GREASE FROM WOOL.

SPECIFICATION forming part of Letters Patent No. 440,963, dated November 18, 1890.

Application filed February 10, 1890. Serial No. 339,946. (No model.)

*To all whom it may concern:*

Be it known that I, LEO PINAGEL, a citizen of Germany, residing at Aix-la-Chapelle, in the Rhine Province, Prussia, German Empire, have invented certain new and useful Improvements in Apparatus for Extracting Grease from Wool, of which the following is a specification.

Many attempts were made heretofore to supply a simple and effective apparatus by which the quantity of grease and moisture contained in raw wool can be accurately and reliably determined; but these attempts were not successful, as either the results were not satisfactory or the method of using the apparatus too complicated, so that the loss of weight which the wool undergoes by the washing process could not be accurately determined before washing. As the raw wool is rated in the wool trade by its appearance and touch, which are productive of considerable errors in judgment, even up to ten per cent., it is obvious that sometimes considerable loss to the buyers as well as to the sellers of wool is caused, and that consequently a simple and reliable apparatus by which the loss in weight caused by washing can be accurately determined before purchasing would be of considerable importance in the trade.

The object of this invention is to supply an apparatus for extracting grease from samples of wool, so as to be able to determine with great accuracy the weight of the wool lost in washing the same; and the invention consists of an apparatus for extracting grease from test quantities of wool, which comprises a receiver for the extracting-liquid, said receiver being heated by a water bath below the same, a vessel supported on said receiver for receiving a sample of the wool, said vessel being connected by small channels with the receiver and also by means of a pipe having a stop-cock, said pipe extending from the outside of the receiver through the lower part of the sample-containing vessel to near the top of the same and being perforated as far as the same is within the vessel, and a condensing-coil which is located above the sample-containing vessel and connected therewith by channels, said coil being surrounded by a cooling-jacket.

The accompanying drawing represents a vertical central section of my improved apparatus for extracting the grease from wool, so that the loss of weight caused in washing the same may be calculated.

In using my improved apparatus a sample of wool, whether it be raw wool, fleeced, washed, or half-washed, or other kind of wool, is taken from a bale, said sample being preferably removed from the bale in such a manner that it represents the average condition of the whole quantity of wool. This sample of wool is accurately weighed and then thoroughly dried at a temperature of from 105° to 110° centigrade. The difference in weight between the wool before drying and after drying indicates the quantity of moisture contained in the wool. The dry sample is then placed in the apparatus for determining the quantity of grease and other matter contained in the wool, which apparatus consists of the following parts: A receiver A, preferably of spherical shape, is placed upon the water bath W, which is heated by a gas or other burner placed below the same. The receiver A is charged with a suitable extracting-liquid, such as benzine, sulphide of carbon, sulphuric ether, or other suitable extracting-liquid. On the receiver A is supported a vessel B, which is connected with the receiver by means of channels $a$, said vessel being screwed by an interiorly-threaded flange onto an exteriorly-threaded boss of the receiver A. The thoroughly-dried wool sample is placed into the vessel B and the same closed by means of a cap B', which is screwed into its upper end, said cap being provided with two perforations $b$, which are connected with the ends of a condensing-coil S, which is surrounded by a water-jacket T, to which cooling-water is supplied. The vessel B is further provided with a gage $g$ for observing the level of the liquid in the vessel B. A pipe R extends from the upper part of the receiver A to the vessel B, enters into the lower part of the same, and passes at the inside of the vessel to the upper part of the same. The pipe R is perforated at that portion located in the vessel B and provided outside of the receiver A and vessel B with a stop-cock H, as shown clearly in the drawing. When the apparatus is started, the stop-cock H is closed. By heating the water bath the extracting-liquid is quickly raised to the boiling-point, so that the vapors of the same pass through the wool in the vessel B, whereby they are partly condensed. The perforated pipe R, which extends into the vessel B, serves to some extent as a condenser of the vapors within said vessel and receives said vapors at different points along its length through the perforations, whereby the vapor in passing to the perforated pipe is distributed throughout the mass of wool in the vessel. The uncondensed vapors pass through the condensing-coil C, in which they are condensed by the cooling-water and reconducted to the wool in the vessel B, where the temperature is kept at the boiling-point, so that gradually the grease fs fully extracted from the wool. As long as the extracting-liquid in the gage shows a yellowish tinge, the extracting operation is continued, care being taken that the stop-cock H is opened from time to time during the extracting operation, so as to return the extracting-liquid, with the grease, back into the receiver A. In this manner continually fresh vapors are forced through the sample of wool in the vessel B, which is continued until the liquid in the gage appears perfectly clear. The heating operation is then interrupted and the receiver A allowed to cool, which produces a partial vacuum in the latter and causes all the extracting-liquid and the grease dissolved by the same to flow from the vessel B into the receiver A. The sample of wool is then removed from the vessel B and carefully dried, so that the vegetable or other impurities that adhere to the wool become disintegrated and can be readily dissolved in water heated up to 80° centigrade. The wool is then cleansed by washing it in clean water and then again dried and weighed.

The difference between the weight of the sample of the first and last drying operation indicates the quantity of grease and earthy matter which is contained in the sample of wool. If necessary, the sample is subjected to an acid treatment in the usual manner for carbonizing and destroying the vegetable matter contained in the wool and then the final drying performed after carbonization.

By treating the wool in the manner above described it is possible to determine accurately, first, the quantity of moisture in the wool; secondly, the quantity of grease and earthy matters, and, thirdly, the quantity of vegetable impurities adhering to the same.

As the quantity of moisture contained in wool is fixed by international usage at seventeen per cent., it is obvious that when this percentage is added to the weight lost in washing, as determined by the described apparatus, the apportionate weight of the wool when washed is thereby determined.

The following example will readily explain the above-described method: A sample of raw wool with the grease, &c., weighs

| | |
|---|---|
| Before drying | 502,100 |
| After drying | 432,200 |
| Loss | 69,900 or 13.921 per cent. of water. |
| Weight after drying | 432,200 |
| Weight after extracting the grease | 305,900 |
| Leaving a difference of | 126,300 or 25.154 per cent. of grease. |
| Weight after extracting the grease | 305,900 |
| Weight after being carbonized by acid and again dried | 300,700 |
| | 5,200 or 1.035 per cent. of vegetable matter. |

The total loss is therefore 13,921+25,154+1,035=40.110 per cent.

As one hundred parts of raw wool lost 40.110 per cent. in drying and extracting the moisture and grease, 59.890 per cent. of thoroughly-dried wool are left, which contain about seventeen per cent. of moisture—to wit, 59,890+10,181=70,071—so that consequently the loss in reference to the normal moisture amounts to 100−70,071=29.929 per cent.

It thus appears that the above-described apparatus permits the making of accurate tests and the determining of the loss of moisture and grease to which the wool is subjected in washing in a quick, convenient, and effective manner.

Having thus described my invention, I claim as new and desire to secure by Letters Patent—

An apparatus for extracting grease from wool, consisting of a receiver for containing the extracting-liquid, a vessel above the receiver for containing the wool to be treated, communicating passages between said vessel and receiver, a pipe extending from said receiver into said vessel near the bottom thereof and up through the interior of said vessel to near the top thereof, said pipe being perforated along its length within said vessel, and a condenser surmounting said vessel, substantially as described.

In testimony that I claim the foregoing as my invention I have signed my name in presence of two subscribing witnesses.

LEO PINAGEL.

Witnesses.
 JOHN HECKMANNS,
 TH. WILLNICH,